United States Patent Office.

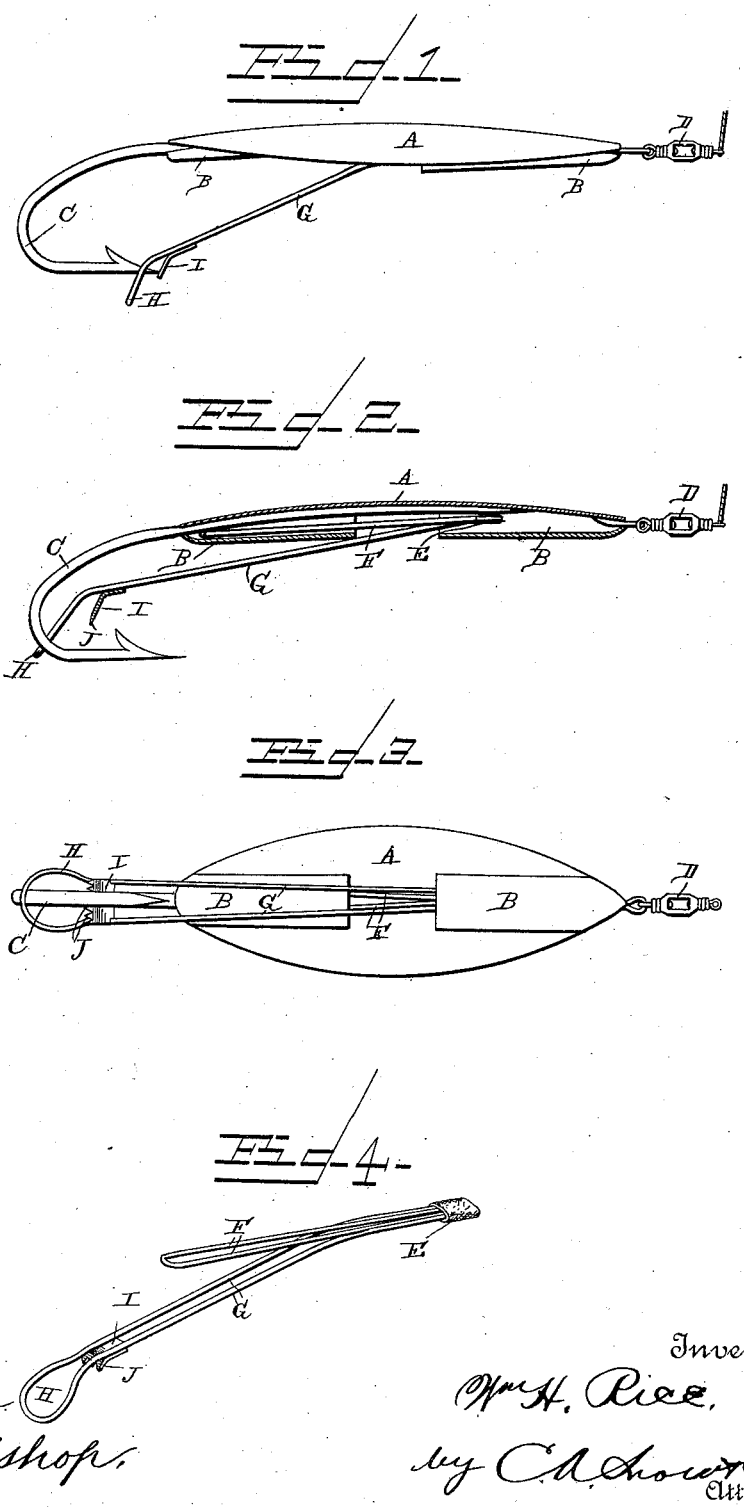

WILLIAM H. RICE, OF ADDISON, NEW YORK.

FISH-HOOK.

SPECIFICATION forming part of Letters Patent No. 379,080, dated March 6, 1888.

Application filed December 20, 1887. Serial No. 258,537. (No model.)

*To all whom it may concern:*

Be it known that I, WILLIAM H. RICE, a citizen of the United States, residing at Addison, in the county of Steuben and State of New York, have invented a new and useful Improvement in Fish-Hooks, of which the following is a specification.

My invention relates to improvements in fish-hooks; and it consists in certain novel features, hereinafter first fully described, and then pointed out in the claims.

The object of my invention is to provide a fish-hook with certain improvements whereby the point of the hook will be kept free of floating grass and weeds when in the water.

With this object in view my invention consists in a shield or plate which is normally held over the point of the hook while the same is in the water, and which is released from its engagement over the point of the hook by the action of the fish in biting.

My invention also consists in the construction of the said shield and in the means employed for holding the same over the point of the fish-hook.

In the accompanying drawings I have shown my improved device applied to a trolling or spoon hook, and in said drawings Figure 1 is a side view of the hook provided with my improvement. Fig. 2 is a longitudinal vertical section. Fig. 3 is a bottom plan view of the same, and Fig. 4 is a detail perspective view of the shield.

On the under side of the spoon A, along the central longitudinal line of the same, I secure at the ends thereof the sleeves B B, the inner adjacent ends of which are open and the outer ends of which are closed, as clearly shown. The shank of the hook C is secured to the under side of the spoon, which at its forward end is provided with the usual swivel, D, for attachment to the line. A sliding plate, E, is provided within the sleeve B at the front end of the spoon, and a series of light spring rods or wires, F G, are secured to said sliding plate and extend rearwardly therefrom. The springs F pass into the rear sleeve, B, and bear against the sides of the same. The springs G pass downward and rearward from the forward sleeve and are united at their outer extremities, forming a loop, H, which passes around the fish-hook point. A shield, I, is secured to the springs G, and is adapted to bear against the point of the hook and protect the same, as shown in Fig. 1. This shield consists of a light plate of metal or other suitable material soldered or otherwise rigidly secured to the springs G, and having a series of barbs or teeth, J, constructed along its lower edge.

It will be understood, of course, that the shield is arranged so that the point of the hook will bear against the rear side thereof, near the edge or point of one of the barbs. In this position a light upward or lateral push on the trigger will be sufficient to release the shield from engagement with the point of the hook, when the springs will at once force it back to the position shown in Fig. 2. It will thus be seen that when a fish attempts to bite at the bait he will strike the trigger either from below or from one side, and the result will be an instantaneous releasing of the shield and disclosure of the hook. The hook enters the flesh of the fish simultaneously with its disclosure, so that the capture of the fish is rendered certain. In his efforts to escape the fish will force his body against the barbs in the lower edge of the shield, which will thereupon enter his flesh. The fish will thus effectually be secured by the barb of the hook and the barbs of the shield acting in conjunction therewith and in opposition thereto.

From the foregoing description, taken in connection with the accompanying drawings, it will be seen that I have provided a very simple and efficient device which will prevent the hook, as it is drawn through the water, collecting and being clogged by the floating weeds and grass. The construction of the device is such that it is allowed free movement to the necessary degree, and the springs maintain it in the proper position to be held against the point of the hook.

Having thus described my invention, what I claim, and desire to secure by Letters Patent, is—

1. A fish-hook provided with a shield consisting of springs arranged below the shank of the hook, and a plate secured to said springs and normally held thereby against the point of the hook, substantially as set forth.

2. A fish-hook provided with a shield consisting of springs arranged below the shank of the hook, and a plate secured to said springs and normally held thereby against the point of the hook, the said plate having a series of barbs or teeth along its lower edge, as set forth.

3. A fish-hook provided with a shield, consisting of springs arranged below the shank of the hook and extended beyond the point of the hook to form a trigger, and a plate carried by said springs and normally held by the same against the point of the hook, as set forth.

4. A trolling-spoon having a shield loosely mounted on its under side and normally covering the point of the hook, the said shield being adapted to be moved longitudinally of the spoon and disclose the hook when struck by the fish in the act of biting, substantially as described.

5. The combination of the spoon having the sleeves B B on its under side, the hook, and the sliding spring-shield mounted in the sleeves and normally covering the point of the hook, substantially as set forth.

6. The combination of the spoon having the sleeves B B and the springs F G, united at their forward ends in one of said sleeves, the springs F extending into and bearing against the other of said sleeves, and the springs G extending downward and carrying a shield for the point of the hook, as set forth.

In testimony that I claim the foregoing as my own I have hereto affixed my signature in presence of two witnesses.

WILLIAM H. RICE.

Witnesses:
  E. G. SIGGERS,
  J. H. SIGGERS.